(12) United States Patent
Polo et al.

(10) Patent No.: US 12,680,759 B2
(45) Date of Patent: Jul. 14, 2026

(54) INSPECTION APPARATUS FOR MELTING FURNACES THAT CAN BE USED IN THE STEEL INDUSTRY AND METHOD

(71) Applicant: Danieli Automation S.p.A, Buttrio (IT)

(72) Inventors: Andrea Polo, San Giovanni Al Natisone (IT); Enrico Villagrossi, Goito (IT); Simone Mongiat, Udine (IT)

(73) Assignee: DANIELI AUTOMATION S.P.A., Buttrio (IT)

( * ) Notice: Subject to any disclaimer, the term of this patent is extended or adjusted under 35 U.S.C. 154(b) by 679 days.

(21) Appl. No.: 18/018,476

(22) PCT Filed: Jul. 30, 2021

(86) PCT No.: PCT/IT2021/050236
§ 371 (c)(1),
(2) Date: Jan. 27, 2023

(87) PCT Pub. No.: WO2022/024160
PCT Pub. Date: Feb. 3, 2022

(65) Prior Publication Data
US 2023/0258404 A1    Aug. 17, 2023

(30) Foreign Application Priority Data
Jul. 30, 2020    (IT) ........................ 102020000018511

(51) Int. Cl.
*F27B 3/28*        (2006.01)
*F27D 21/02*       (2006.01)
(Continued)

(52) U.S. Cl.
CPC ............... *F27B 3/28* (2013.01); *F27D 21/02* (2013.01); *H04N 23/23* (2023.01); *H04N 23/45* (2023.01);
(Continued)

(58) Field of Classification Search
None
See application file for complete search history.

(56) References Cited

U.S. PATENT DOCUMENTS

| | | | |
|---|---|---|---|
| 4,131,914 A | 12/1978 | Bricmont | |
| 2005/0073673 A1 | 4/2005 | Devitt et al. | |

(Continued)

FOREIGN PATENT DOCUMENTS

| | | |
|---|---|---|
| BR | 102018072966 A2 | 5/2020 |
| CN | 208841421 U | 5/2019 |

(Continued)

OTHER PUBLICATIONS

International Search Report and Written Opinion issued Oct. 29, 2021 in PCT/IT2021/050236.

*Primary Examiner* — Samira Monshi
(74) *Attorney, Agent, or Firm* — Panitch Schwarze Belisario & Nadel LLP

(57) ABSTRACT

An inspection apparatus for melting furnaces that can be used in the steel industry, includes an inspection head and a positioning support, said inspection head including a rotating table. Said inspection head includes one or more image detection devices attached on said rotating table and which rotate in a manner integral with it. Said positioning support is suitable for the insertion of the inspection head into said melting furnace through an inlet aperture of the melting furnace. Also disclosed is an inspection method for melting furnaces that can be used in the steel industry, by means of an inspection apparatus.

25 Claims, 2 Drawing Sheets

(51) Int. Cl.
   *H04N 23/23*       (2023.01)
   *H04N 23/45*       (2023.01)
   *H04N 23/50*       (2023.01)

(52) U.S. Cl.
   CPC ..... *H04N 23/555* (2023.01); *F27D 2021/026*
   (2013.01)

(56)                 References Cited

U.S. PATENT DOCUMENTS

| | | | |
|---|---|---|---|
| 2014/0072012 | A1 | 3/2014 | Kreutzer |
| 2014/0182373 | A1 | 7/2014 | Sbihli et al. |
| 2022/0226920 | A1* | 7/2022 | Johansen ................. B25J 13/08 |

FOREIGN PATENT DOCUMENTS

| | | | |
|---|---|---|---|
| JP | S61155940 | A | 7/1986 |
| WO | 9963383 | A1 | 12/1999 |

* cited by examiner

INSPECTION APPARATUS FOR MELTING FURNACES THAT CAN BE USED IN THE STEEL INDUSTRY AND METHOD

CROSS-REFERENCE TO RELATED APPLICATIONS

This application is a Section 371 of International Application No PCT/IT2021/050236, filed Jul. 30, 2021, which was published in the English language on Feb. 3, 2022, under International Publication No. WO 2022/024160 A1, which claims priority under 35 U.S.C. § 119(b) to Italian Application No. 102020000018511, filed Jul. 30, 2020, the disclosures of each of which are incorporated herein by reference.

FIELD OF THE INVENTION

Embodiments described here concern an inspection apparatus for hostile and/or dangerous environments, in particular for high temperature environments.

The inspection apparatus according to the present invention is configured to acquire images and/or videos in environments where an operator cannot have direct access in safe conditions.

Preferably, but not restrictively, the inspection apparatus can be applied in the steel industry for the production of steel or other metals, or in the production of glass materials, for example in electric arc furnaces, ladles, submerged arc furnaces, melting or refining furnaces, induction melting furnaces or induction heating furnaces or suchlike.

The invention also concerns an inspection method which uses said inspection apparatus.

BACKGROUND OF THE INVENTION

Hostile environments are known, in which the direct presence of man is not allowed and not possible. Examples are environments that have extreme temperature conditions, such as extremely high or cryogenic temperatures, but also environments with a high concentration of corrosive gases, or with a potentially explosive atmosphere, or simply unknown environments that are difficult to access.

Examples of these environments can be furnaces for working metals, freezing apparatuses, nuclear plants, plants for the production of aggressive chemical substances and suchlike.

Often, or periodically, there is a need to inspect these environments, for example to assess the need for maintenance, the status of a production process, the need to secure the environment before access by an operator and so on. Another example may be the need to assess the presence of people in difficulty, as in the case where the hostile environment is a site where a fire is under way and the need to intervene to save human lives must be assessed.

Apparatuses for the acquisition of images or videos are therefore known, for example by means of video cameras, thermal cameras, X-ray systems, for example installed on an inspection head that can be moved by means of appropriate drive and control systems.

Usually, known apparatuses allow to frame more than one part of the environment, if not a complete 360-degree panoramic view.

One disadvantage of the apparatuses known to the state of the art is that, in order to obtain an extended or panoramic view of the environment, it is necessary to install on the head a plurality of image detection devices of the same type, each oriented with respect to the others at a suitable angle, to acquire a plurality of images as obtained by each of said devices, and subsequently process them to obtain a complete image.

An example of such solutions is described in the Italian patent ITUB2015A009279 which provides a plurality of video cameras that each acquire a corresponding optical image from the totality of which an optical panoramic view of the environment is obtained.

However, because of the criticality due to the environmental conditions, the devices installed on said apparatuses are very burdensome from a technological and also an economic point of view. For example, they must be able to withstand extreme temperatures and/or corrosion from possible chemical agents.

Furthermore, in order to obtain continuous scans it is necessary to use a large number of devices, unless it is possible to accept discontinuities, or lack of images, in the sectors that are not covered by any device.

One disadvantage is also the need to integrate images coming from different devices, each with its own technical characteristics and orientation in space. The computational effort of processing the images can therefore be high.

Document US 2014/0072012 A1 describes an inspection system suitable for the inspection of pipes, in particular sewerage pipes, provided with a slider to move an inspection head inside said pipes. The system comprises a temperature measuring device, which can be an infrared sensor, not expressly used to acquire thermal images. The inspection head, comprising the thermal and optical sensors, is positioned so as to rotate around an axis longitudinal to the body of the system.

Document CN 208 841 421 U describes a robot for the automatic inspection of the nozzle of a blast furnace, comprising a body moved by four wheels. On the front side of the upper surface of the body, an inspection head is positioned which has a video camera on the left side and an infrared camera on the right side.

Document U.S. Pat. No. 4,131,914 A describes a system suitable to inspect a coke oven, provided with a head, which comprises a video camera, positioned at the end of a piston on the longitudinal axis of said piston. The head can be rotated around the longitudinal axis and moved vertically by moving the piston.

Document US 2014/0182373 A1 describes a probe to inspect dangerous or submarine environments, not expressly suitable for applications where there may be high temperatures. On the terminal part of the probe a support is fixed to which a video camera is constrained. The support is positioned in line with a longitudinal axis at least of the terminal part of the probe, and can rotate around the longitudinal axis. Furthermore, the video camera can modify its inclination with respect to the support around the axis of constraint.

Document US 2005/0073673 A1 describes an inspection system of hot gas components for a turbine. The inspection head, comprising one or more image detection devices, is positioned on a support that rotates around the longitudinal axis of the arm of a robot that supports and moves the inspection head. The support, which therefore lies on a plane orthogonal to the longitudinal axis, can also be inclined with respect to said plane.

Document WO 99/63383 A1 describes a system to inspect chambers for industrial processes, such as boilers, combustion chambers, chemical process chambers and suchlike. The inspection head, comprising one or more image detection devices, is positioned on a lance. At least one terminal part of the lance can rotate around its longitudinal axis, moving the inspection head in rotation. The inspection head can also be inclined with respect to the plane orthogonal to the longitudinal axis.

There is therefore a need to perfect an inspection apparatus which can overcome at least one of the disadvantages of the state of the art.

In particular, one purpose of the present invention is to provide an inspection apparatus which can be used in hostile and/or dangerous environments in conditions of substantial safety with respect to damage and malfunctions.

Another purpose of the present invention is to provide an inspection apparatus which allows to carry out continuous scans of the environment, without blind spots in the acquisition.

Another purpose is to reduce the economic burden required for image detection devices or, given the same economic burden, to increase the technological performance of the inspection apparatus.

It is also a purpose to perfect an inspection method using said inspection apparatus.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, embodiments described here concern an inspection apparatus for melting furnaces that can be used in the steel industry, comprising an inspection head and a positioning support to support the inspection head.

The positioning support as above is suitable for the insertion of the inspection head into the melting furnace, through an inlet aperture of the melting furnace.

In accordance with some embodiments, the inspection head comprises at least one image detection device. The image detection devices can be cameras, video cameras, thermal imaging cameras or other similar or comparable elements. In one solution of the invention, the inspection head comprises both a camera, or video camera, and also a thermal imaging camera, in order to obtain both optical images as well as thermal images of the environment being analyzed.

The inspection head can also comprise, in addition or as an alternative to those indicated above, other image detection devices such as, for example, laser scanners or radars.

The inspection head can also comprise a temperature sensor. In this way, it is possible to detect a possible situation of risk caused by an excess of heat that can damage the image detection devices and/or other devices and/or sensors and/or electronic, mechanical, pneumatic and/or similar elements, and command the withdrawal of the head from the hostile environment.

The inspection head comprises a platform and a body.

The platform can be able to support the one or more image detection devices and the possible temperature sensor.

In one aspect of the invention, the platform is mobile, being able to rotate with respect to the body. In particular, the platform can have a rotating table and an edge.

The rotating table as above can be positioned on a substantially horizontal plane, at least when it is in an operating condition inside the melting furnace.

Advantageously, the positioning of the rotating table on a horizontal plane allows to position the image detection devices so as to detect images of the lateral walls and of a lateral part of the upper wall, or ceiling.

The central part of the upper wall can usually be open, or the electrodes can be raised during the working steps during which the inspection can be carried out, for example the refining step. Therefore, there is generally no need to detect images of the entire central part of the upper wall.

The one or more image detection devices can have a viewing aperture on the horizontal plane as above comprised between 30° and 95°, preferably 60°. They can also have a viewing aperture on a vertical plane comprised between 30° and 95°, preferably 60°.

Advantageously, the size, in bits, of the image files can therefore be small, simplifying the operations for saving and/or transmitting the images and the complexity of the electronic components used.

Preferably, the rotating table can rotate with respect to an axis thereof at least up to an angle of 360°. The 360° rotation can be continuous in the same sense, or it can provide reversals of direction.

In particular, the axis as above can be a substantially vertical axis. The inclination of such axis with respect to the vertical can be less than or equal to 0.5°, for reasons related for example to mechanical clearances or weight of the system.

Advantageously, the image detection devices can therefore scan at least up to 360° of the surrounding environment. In particular, it is also possible to carry out continuous scans of the surrounding environment.

According to some embodiments, the inspection head comprises only one device of each type, for example, a single optical or thermal image acquisition device, or a single optical image acquisition device and a single thermal image acquisition device, or a single optical image acquisition device and a single thermal image acquisition device and a single radar, or other combination of devices.

One advantage, in fact, is that it is not necessary to use several devices of the same type, for example it is not necessary to use multiple video cameras or multiple thermal imaging cameras, to obtain all the desired images.

The body is constrained to the positioning support and in turn supports the platform.

The body is able to contain the electronic and/or mechanical and/or pneumatic and/or similar elements for the functioning and movement of the platform and the devices comprised therein.

Advantageously, the body can be configured to protect the electronic and/or mechanical and/or pneumatic and/or similar elements as above from hostile elements present in the surrounding environment.

Advantageously, the inspection head, and possibly at least the part of the positioning support able to be inserted in the hostile environment, are insulated, so as to protect their contents from a possible hostile temperature in the environment.

The inspection head also comprises ducts and mouths for the transit of compressed air. It is therefore an advantage that, by means of such compressed air, it is possible to control the local temperature.

ILLUSTRATION OF THE DRAWINGS

These and other aspects, characteristics and advantages of the present invention will become apparent from the following description of some embodiments, given as a non-restrictive example with reference to the attached drawings wherein:

FIG. 1 is a perspective view of an inspection apparatus, during use, according to some embodiments described here;

FIG. 1*a* is a perspective view of a detail of the inspection apparatus of FIG. 1;

Figure 1:
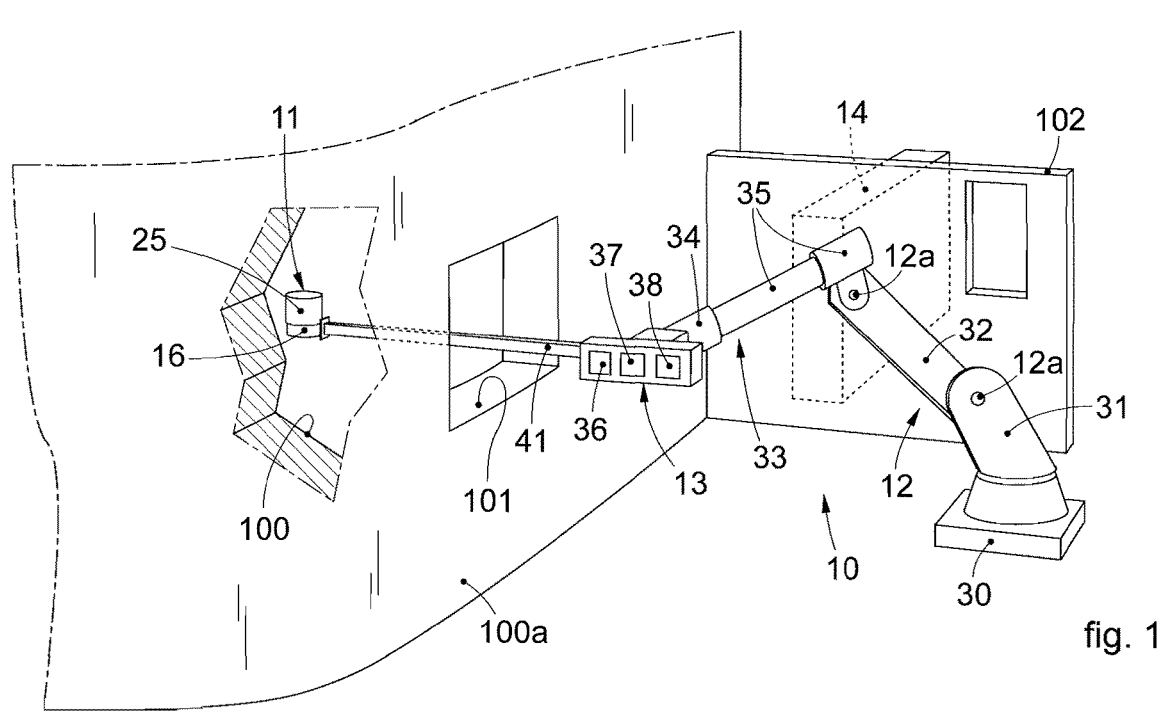
Figure 1A:
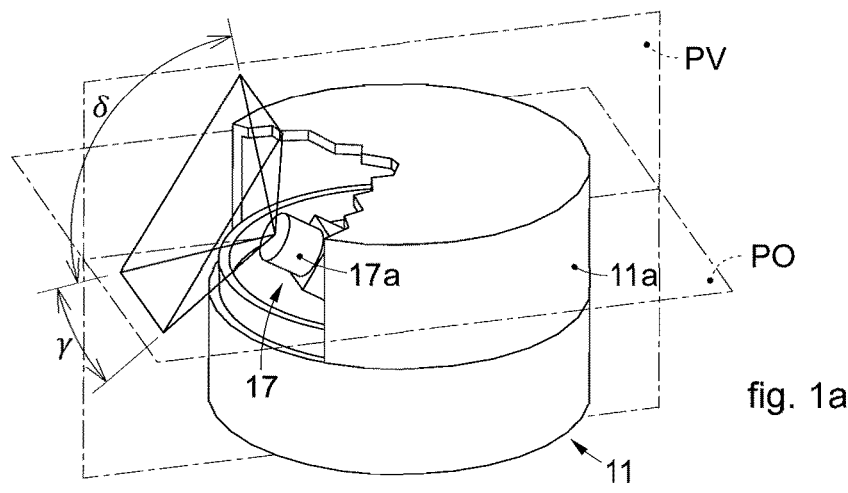
Figure 3:
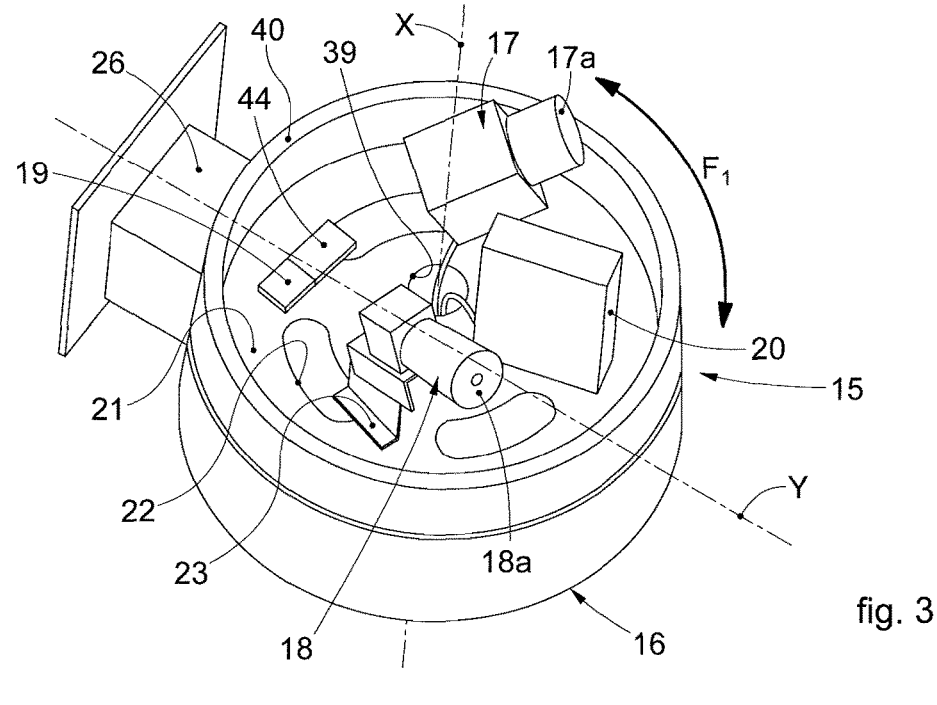
FIG. 3 is a perspective view of the lower part of the inspection head of the inspection apparatus of FIG. 1.
Figure 3A:
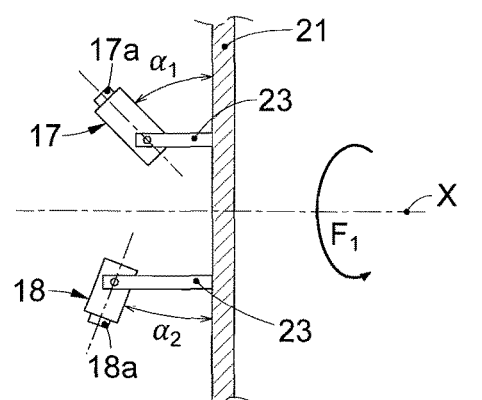
Figure 3B:
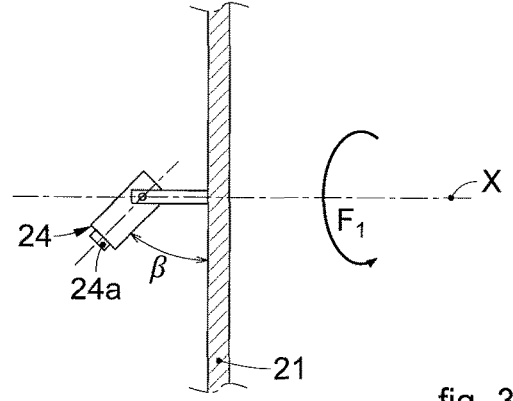
Figure 5:
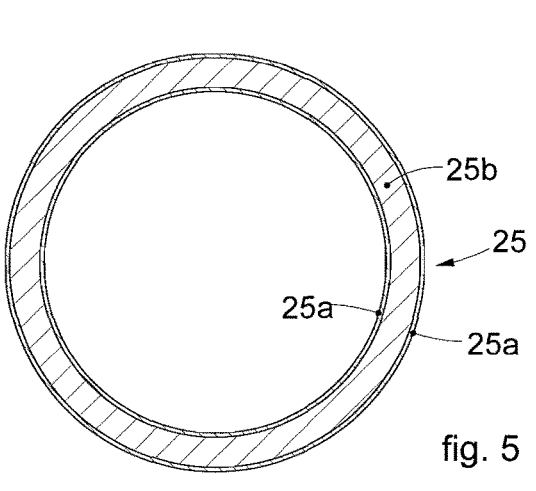
Figure 4:
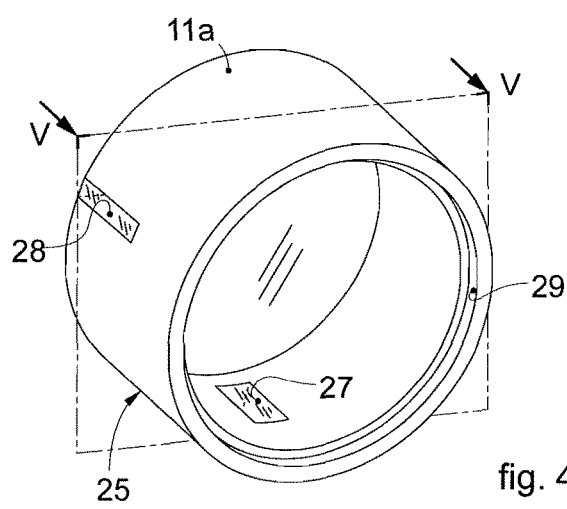

FIGS. 3*a* and 3*b* are schematic representations of the disposition of image detection devices of the inspection head of FIG. 3;

FIG. 4 is a perspective view of the upper part of the inspection head of the inspection apparatus of FIG. 1;

FIG. 5 is a section view of the body of FIG. 4, according to plane V-V.

To facilitate comprehension, the same reference numbers have been used, where possible, to identify identical common elements in the drawings. It is understood that elements and characteristics of one embodiment can conveniently be combined or incorporated into other embodiments without further clarifications.

DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

Embodiments described here, using the attached drawings, concern an inspection apparatus 10, hereafter simply apparatus, for hostile and/or dangerous environments 100, used for example to assess the need to carry out maintenance interventions, the status of a production process, the presence of human beings under duress, the need to secure the environment 100 before an operator accesses it and so on.

Some environments 100 can have conditions of extreme temperatures, such as high or cryogenic temperatures, but also high concentrations of corrosive gases, or with a potentially explosive atmosphere, or they are simply unknown environments, difficult to access and in which dangerous conditions could exist.

Some of such environments 100 can be melting furnaces for metal processing plants, freezing apparatuses, nuclear plants, plants for producing aggressive chemical substances and suchlike. In particular, the inspection apparatus 10 is particularly suitable to inspect melting furnaces 100*a* that can be used in the steel industry.

According to the embodiments of FIG. 1, the apparatus 10 can comprise an inspection head 11 and a corresponding positioning support 12.

The apparatus 10 can also comprise a processing unit 13.

The apparatus 10 can also comprise an electrical control panel 14.

According to some embodiments, the processing unit 13 can comprise an image processing system 36 and/or a data processing system 37.

The processing unit 13 can also comprise a movement control unit 38.

According to some embodiments, the electrical control panel 14 can contain elements for the power supply of the apparatus 10, connected for example to an electricity grid.

According to one variant not shown, the electrical control panel 14 can contain both the elements for the power supply of the apparatus 10 as well as the processing unit 13 as above.

According to another variant not shown, the electrical control panel 14 can contain both the elements for the power supply of the apparatus 10 as well as the movement control unit 38.

According to some embodiments, the apparatus 10 can also comprise a gas or liquid protection system, for example air or water, not shown in the drawings. Such protection system can be a system for regulating the temperature around the inspection head 11, for example a heating or cooling system. Such protection system can also be a system for removing corrosive gases, for example thus preventing a high concentration of corrosive gases, or suchlike, around the inspection head 11.

Preferably, but not exclusively, such protection system is a compressed air cooling system.

The inspection head 11 can comprise a platform 15 and a body 16.

As shown in FIG. 3, the platform 15 can be positioned on the body 16.

The platform 15 can comprise one or more image detection devices 17, 18, 24, hereafter referred to as devices 17, 18, 24.

According to some embodiments, the one or more devices 17, 18, 24 can be able to rotate around an axis X of the platform 15. For example, the axis X is an axis central with respect to the inspection head 11.

The axis X can be a substantially vertical axis. In particular, the inclination of the axis X with respect to the vertical is advantageously less than or equal to 0.5°. In general, in other embodiments, the invention can also be applied in situations in which the axis X varies from −35° to +35° with respect to the vertical.

As another example not shown in the drawings, the axis X can be an axis orthogonal to the platform 15, positioned centrally with respect to the platform 15 and not centrally with respect to the inspection head 11. For example, according to one variant not shown, the platform 15 is constrained to the body 16 in a position that is not centered or not in axis.

The one or more devices 17 can be able to acquire optical images, such as one or more sequences of frames or films; for example, they can be cameras, telephoto cameras, video cameras or suchlike.

The one or more devices 18 can be thermal imaging cameras, able to acquire thermal images or footage.

The one or more devices 24 can also integrate both optical and also thermal technologies within a single device, for example providing at output also optical and thermal images combined with each other.

As a preferential but not exhaustive example, the inspection head 11 can comprise a single optical image detection device 17 and a single thermal image acquisition device 18, and not comprise other devices.

According to another preferential but not exhaustive example, the inspection head 11 can comprise a single optical image detection device 17 and not comprise thermal image detection devices 18, 24.

According to another non-exhaustive example, the inspection head 11 can comprise a single optical and thermal image detection device 24 and not comprise other optical 17 and/or thermal 18 image detection devices.

The one or more devices 17, 18, 24 can have a respective inclination $\alpha 1$, $\alpha 2$, $\beta$ with respect to the platform 15. The angles of inclination $\alpha 1$, $\alpha 2$, $\beta$ can be the same or different from each other, as in the example case of FIG. 3a, in which there are several devices 17, 18. FIG. 3b shows by way of example the case in which there is a single device 24 positioned in correspondence with the axis X.

The angles of inclination $\alpha1$, $\alpha2$, $\beta$ can take on values comprised between 0° and 90°, preferably comprised between or equal to 1° and 60°, even more preferably comprised between or equal to 10 and 45°.

The angles of inclination $\alpha1$, $\alpha2$, $\beta$ can be changed, for example by means of an automated movement carried out by means of movement means commanded by the control unit 38, such as one or more electric motors, one or more pneumatic motors or suchlike.

The platform 15 can also comprise one or more sensors 19, such as temperature sensors, sensors for detecting chemical substances, or proximity or distance sensors, or suchlike, or an angular position sensor 44. Preferably, the platform 15 can comprise at least one temperature sensor 19.

According to some embodiments, the platform 15 can comprise means for data transmission via cable and/or wireless, not shown in the drawings, to transmit the data sent by the devices 17, 18, 24 and/or by the sensors 19, 44 to the processing unit 13. The data transmission means can be for example wired systems, with or without shielded cables, or wi-fi, Bluetooth or similar communication means.

The platform 15 can comprise one or more connection devices 20 for managing the connection in the wired systems, such as for example converters between USB, Ethernet, RS-485 formats and suchlike, hubs, routers or suchlike.

According to one variant not shown, the platform 15 can comprise one or more data acquisition devices, to acquire, process, locally save and/or transmit the data sent by the devices 17, 18, 24 and/or by the sensors 19, 44.

The platform 15 can have a rotating table 21 and an edge 40.

According to some embodiments, the rotating table 21 and the edge 40 are made in a single body and rotate integrally.

According to one variant not shown, the edge 40 is integral with the body 16 and the rotating table 21 rotates with respect to the edge 40.

The rotating table 21 can be positioned on a substantially horizontal plane PO, at least when it is in an operating condition inside the melting furnace.

The one or more devices 17, 18, 24 and/or sensors 19, 44 and/or connection devices 20 and/or data acquisition devices can be attached in an integral manner in correspondence with the rotating table 21. In particular, the one or more image detection devices 17, 18, 24 can be positioned on the rotating table 21 so as to have their optics 17a, 18a, 24a in correspondence with a lateral wall 11a of the inspection head 11.

The one or more image detection devices 17, 18, 24 can have a viewing aperture $\delta$ on a vertical plane PV comprised between 30° and 95°, preferably between 55° and 65°, even more preferably of about 60°.

The one or more image detection devices 17, 18, 24 can have a viewing aperture $\gamma$ on a horizontal plane PO comprised between 30° and 95°, preferably between 55° and 65°, even more preferably of substantially 60°.

The viewing apertures $\delta$ and $\gamma$ can be the same or different from each other.

According to some embodiments, the measurement of the angular position by means of the sensor 44 can allow to associate the angular position of the rotating table 21 with one or more acquired images. Advantageously, in this way it is possible to localize the image acquired with respect to the environment 100 inspected.

According to some embodiments, the one or more devices 17, 18, 24 and/or sensors 19, 44 and/or connection devices 20 and/or acquisition devices can be constrained to the rotating table 21 by means of attachment elements 23, such as brackets, screws, glue and suchlike.

The platform 15 can also comprise means for moving the rotating table 21, not shown in the drawings.

The movement means can be one or more electric motors, one or more pneumatic motors or suchlike.

The platform 15 can also comprise other electronic and/or mechanical and/or pneumatic and/or oleodynamic elements for the functioning and movement of the platform 15 and/or of the one or more devices 17, 18, 24 and/or sensors 19, 44 and/or connection devices 20 and/or data acquisition devices positioned thereon, such as, as a non-limiting example, electronic data conditioning circuits, motor control and regulation systems, motors, power supply systems, pipes and/or pipelines and suchlike.

According to some embodiments, the rotating table 21 is able to be constrained, on the body 16, in a manner that is moveable by rotation around the axis X of the platform 15 or equivalently the axis X of the rotating table 21.

According to the variant as above, not shown, the rotating table 21 is constrained to the edge 40, in a manner that is moveable by rotation around an axis X which is not central with respect to the body 16.

According to some embodiments, the one or more devices 17, 18, 24 attached on the rotating table 21 of the platform 15 rotate integrally with the platform 15 with respect to the axis X.

The rotating table 21 can be able to rotate around the axis X in one sense of rotation, or in both senses of rotation, as indicated by the arrow F1 in FIG. 3.

The rotation that the rotating table 21 can perform can be smaller than a round angle of 360°, or equal to or greater than 360°. Preferably, the rotation is at least equal to or greater than 360°, in order to allow the one or more devices 17, 18, 24 to frame a 360° panoramic strip of the environment 100.

The rotation can be continuous or intermittent.

Advantageously, the rotation speed of the rotating table 21 is such as to allow to complete the image acquisition in an amount of time sufficiently short to not damage the inspection head 11 exposed to the hostile environment 100.

The framed strip of the environment 100 can be more or less expansive in height, depending on the typical parameters of the devices 17, 18, 24, such as for example the angle of view, the distance from the framed element and suchlike.

According to some embodiments, the apparatus 10 can be able to detect multiple strips of the environment 100.

In one variant, the apparatus 10 can be suitable to perform a "spherical" scan of the environment 100, by means of a rotation of the inspection head 11, or the rotating table 21, around an axis Y perpendicular to the axis X.

According to some variants, the apparatus 10 can be able to detect several strips of the environment 100 by moving the inspection head 11 in height by means of the positioning support 12. According to some variants, not shown in the drawings, the apparatus 10 can be able to detect several strips of the environment 100, by varying the angle of inclination $\alpha1$, $\alpha2$, $\beta$ of the devices 17, 18, 24 with respect to the platform 15 at the end of the scanning of each strip, for example by means of the automated movement of the inclination of the devices 17, 18, 24 carried out by the movement means.

According to some embodiments, the rotating table 21 can have one or more slots 22 able to allow the assembly of the one or more devices 17, 18, 24 and/or sensors 19, 44 and/or connection devices 20 and/or data acquisition devices, even in differentiated positions.

The one or more slots 22 can also be able to allow air to escape from inside the inspection head 11.

According to some embodiments, the rotating table 21 can also have a central hole 39, able to allow the passage of the electric cables of the one or more devices 17, 18, 24 and/or sensors 19, 44 and/or connection devices 20 and/or data acquisition devices toward the inside of the inspection head 11.

According to some embodiments, the body 16 is integrally attached to the positioning support 12. The attachment to the positioning support 12 can be achieved by means of a flange 26.

According to one variant, the body 16 can contain, also with a protective function, the motors and/or electronic and/or mechanical and/or pneumatic and/or oleodynamic elements for the functioning and movement of the platform 15.

The body 16 can also contain one or more of the devices 17, 18, 24 and/or sensors 19, 44 and/or connection devices 20 and/or data acquisition devices positioned thereon, such as, as a non-exhaustive example, electronic data conditioning circuits, motor control and regulation systems, motors, power supply systems, pipes and/or pipelines, and suchlike, not shown in the drawings.

According to some embodiments, the inspection head 11 can have an external upper cover 25.

As shown in FIG. 5, the external upper cover 25 can be insulated, in particular it can have three or more layers, for example two external layers 25a of metallic material and an internal layer 25b of insulating material.

According to some embodiments, the rotating table 21 and/or the body 16 can also be of the insulating type, for example in a similar way to the upper cover 25, in order to prevent, for example, damage to the electronic and/or mechanical and/or pneumatic and/or oleodynamic elements contained inside the inspection head 11.

According to FIG. 4, the upper cover 25 can have apertures 27, 28 that allow the image detection devices 17, 18, 24 to view the outside and acquire images from the environment 100 to be inspected.

In particular, the optics 17a, 18a, 24a of the one or more image detection devices 17, 18, 24 can be positioned in correspondence with the apertures 27, 28 of the lateral wall 11a of the inspection head 11.

The apertures 27, 28 can be equipped with surfaces transparent to the wavelengths of the electromagnetic radiations that the image detection devices 17, 18, 24 can acquire. For example, the apertures 27, 28 can be sheets of glass transparent to visible radiation, in the case of video cameras. Also, they can be surfaces transparent to infrared radiation, in the case of thermal imaging cameras.

According to some embodiments, the upper cover 25 can comprise means 29 for assisting the positioning on the body 16 and/or on the platform 15. For example, such positioning assisting means 29 can be a groove 29, a thread or suchlike, able to cooperate with corresponding coupling elements of the platform 15.

According to the invention, the positioning support 12 can be suitable for the insertion of the inspection head 11 into the melting furnace 100a.

In particular, the insertion preferably occurs through an aperture 101 of the melting furnace 100a. The aperture 101 can preferably be the slagging door, generally present in melting furnaces.

According to some embodiments, the positioning support 12 can be able to support and move the inspection head 11.

In particular, the positioning support 12 can be able to allow the inspection head 11 to be moved according to linear movements, forward and backward, in one, several or all directions.

According to some embodiments not shown in the drawings, the positioning support 12 can for example be a telescopic guide able to make the inspection head 11 advance inside the environment 100.

For example, it can guide the inspection head 11 through an inlet 101, or mouth, of the environment 100, for example the mouth of a furnace.

In particular, the positioning support 12 can be able to allow the inspection head 11 to be moved also according to rotary movements, around one or more points and/or around one or more axes.

Figure 2:
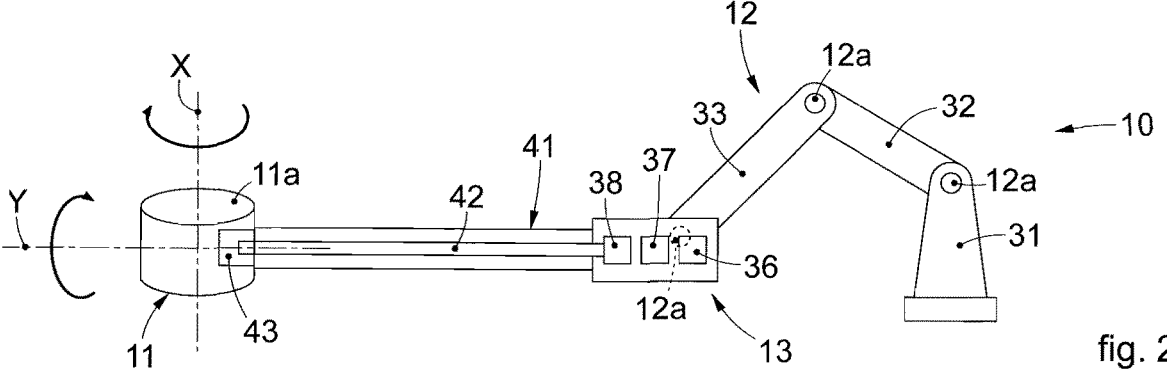
FIG. 2 is a schematic view of the inspection apparatus of FIG. 1, according to some embodiments described here.

According to some embodiments and as shown in FIGS. 1, 2, the positioning support 12 can be a manipulator or a horizontally pivoting member, with two or more movement elements. In particular, the positioning support 12 can be a robotic articulated arm.

Advantageously, it is possible to use the same robotic articulated arm used to move other devices of a known type, for example lances, sampling devices or suchlike, which can assemble and disassemble each of these devices according to the operations to be performed.

The positioning support 12 can have one or more articulation points 12a, preferably two articulation points 12a, possibly three or several articulation points 12a.

For example, the positioning support 12 can comprise a support base 30 and/or one or more rotation members 31 for rotation on a horizontal or vertical plane and/or one or more hinged elements 32 and/or one or more arms 33 and/or a rod 41 and/or joints 34. The one or more arms 33 and the rod 41 can be telescopic or fixed.

For example, a telescopic arm 33 can comprise elements 35 that are coaxial with respect to each other, with a diameter slightly different from each other so as to allow one element 35 to retract into a second element 35.

As shown in FIG. 2, the rod 41 can have an internal shaft 42, able to cooperate with a gear 43 comprised in the inspection head 11 in order to allow the rotation of the inspection head 11 around the axis Y.

In an alternative variant, the gear 43 can be connected only to the rotating table 21 to make it rotate around the axis Y independently of the inspection head 11.

In a preferential embodiment, the axis Y can be in axis with the rod 41.

In a variant not shown, the axis Y can be perpendicular to the axis of the rod 41.

The shaft 42 can be able to be moved by the movement control unit 38, by means of one or more electric, pneumatic or similar devices or motors.

According to some embodiments, the positioning support 12 can be internally hollow, at least in a part thereof, in order to allow the passage of the conduits and/or the signal and/or power supply cables between the inspection head 11 and the processing unit 13 and/or the control panel 14.

According to some embodiments, the positioning support 12 can have, at least in a part thereof, an insulated external surface, for example in a similar manner to the upper cover 25, for example to prevent a cooling fluid passing through the conduits from heating.

According to some embodiments, the processing unit 13 can be positioned as close as possible to the inspection head 11, as shown in FIG. 1, or inside the inspection head 11, for example to reduce the loss of signals caused by ambient electromagnetic noise.

According to some variants, the processing unit 13 can be positioned in the proximity of, or be comprised in, the control panel 14 or in any suitable position whatsoever, for example in a position protected from the hostile elements.

For example, the processing unit 13 can be positioned beyond a protective wall 102.

The image processing system 36 comprised in the processing unit 13 can be able, in a known manner, to process images, such as frames and/or videos. For example, it can process optical and thermal images in order to reconstruct images superimposed with both types of information. As another example, it can reconstruct panoramic images.

The data processing system 37 can be able to acquire data from the sensors 19, 44, to activate procedures for protecting the inspection head 11 from hostile elements in the environment 100 and/or for processing and saving such data, for example for use by technologists.

As a non-exhaustive example, the protection procedures can comprise the withdrawal of the inspection head 11, caused for example by an excess of temperature indicated by a temperature sensor 19, or the repositioning of the inspection head 11 in the event of a probable collision with elements such as walls, ceilings, or obstacles in general, for example detected by means of a proximity sensor 19.

According to some embodiments, the processing unit 13 can, by means of the image processing system 36 and data processing system 37, process data and images in order to identify anomalies, such as cracks, deposits, hot and/or cold spots or suchlike.

The processing unit 13 can therefore comprise one or more processing algorithms, able for example to implement predefined decision rules or to implement programs based on artificial intelligence techniques, such as Deep Neural Networks (DNN) suitably trained to detect one or more anomalies, or similar programs.

According to some embodiments, the processing unit 13 can be connected to at least one display device, not shown in the drawings, for example a pulpit or suchlike, able to allow operators to view in real time the images and data acquired by the devices 17, 18, 24 and/or by the sensors 19, 44.

The processing unit 13 can communicate any anomalies identified to the operator, for example by means of the display device, during the inspection of the environment 100.

According to some embodiments, the processing unit 13 can comprise an internal database, for storing images, videos and/or the results of the image and data processing, for example of the possible anomalies. In an alternative variant, the processing unit 13 can be connected to one or more external databases.

The processing unit 13 can be connected to the control panel 14 for the automated control of the movement of the apparatus 10.

For example, the data processing system 37 can send such data to the control panel 14, in order to activate the procedures for protecting the inspection head 11.

Some embodiments described here also concern an inspection method for hostile and/or dangerous environments 100, in particular an environment 100 of a melting furnace 100a, by means of an inspection apparatus 10 according to the present invention.

According to some embodiments, the inspection method can provide, during use:

the insertion of an inspection head 11 into a melting furnace 100a through an inlet 101 of the melting furnace 100a, by means of a positioning support 12;

the acquisition of optical and/or thermal images of a strip of the environment 100 of the melting furnace 100a which can be framed by one or more optical and/or thermal image detection devices 17, 18, 24, by means of the rotation of a rotating table 21 of a platform 15 of the inspection head 11, by an angle of rotation smaller than a round angle of 360°, or equal to or greater than 360°, around an axis X of the platform 15;

the possible movement of the inspection head 11 to record images of a different strip of the environment 100.

the processing of the images, by means of a processing unit 13.

The inspection method can provide that the insertion, and therefore the acquisition of the images, are carried out after the slagging step or even better after the tapping step of the molten metal and before the resumption of the subsequent melting.

The inspection method can provide that the inspection head 11, at least when inserted into a hot environment such as the inside of the melting furnace, is extracted from the furnace 100a within one minute of its insertion, preferably 30 seconds, even more preferably 10 seconds.

Advantageously, in this way the inspection head 11 is prevented from being exposed for an excessively long period of time to the heat of the hostile environment 100 of the melting furnace 100a.

According to some embodiments, the movement of the inspection head 11 can provide to rotate the inspection head 11 around an axis Y orthogonal to the axis X.

According to alternative embodiments, the movement of the inspection head 11 can provide to rotate only the rotating table 21 around an axis Y orthogonal to the axis X, independently of the inspection head 11.

According to other alternative embodiments, the movement of the inspection head 11 can provide to vary the respective inclinations $\alpha 1$, $\alpha 2$, $\beta$ of the devices 17, 18, 24 with respect to the platform 15.

In this way, as mentioned, it is possible to perform a "spherical" scan of the environment 100.

According to some embodiments, the movement of the inspection head 11 can provide to vary the position of the inspection head 11 in height.

According to some embodiments, the inspection method can provide an initial adjustment of the positioning of the one or more devices 17, 18, 24 on the rotating table 21.

According to some embodiments, the inspection method can also provide to detect positioning adjustment parameters, for subsequent image processing. In fact, by knowing the reciprocal position of the devices 17, 18, 24 and their angular position with respect to the rotating table 21, it can be possible to reconstruct a panoramic shot of the environment also by means of combinations of images coming from different devices 17, 18, 24, for example by superimposing thermal and optical images.

According to some embodiments, the method can provide to measure the angular position of the rotating table 21 by means of an angular position sensor 44, for example an inertial sensor, an encoder or suchlike.

It is clear that modifications and/or additions of parts or steps may be made to the inspection apparatus 10 and to the inspection method as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. An inspection apparatus (10) for melting furnaces (100a) that can be used in the steel industry, comprising an inspection head (11) and a positioning support (12), said inspection head (11) comprising a rotating table (21), wherein said inspection head (11) comprises one or more image detection devices (17, 18, 24) attached on said rotating table (21) and which rotate in a manner integral with it, wherein said positioning support (12) is suitable for the insertion of the inspection head (11) into said melting furnace (100a) through an inlet aperture (101) of the melting furnace (100a), wherein said one or more devices (17, 18, 24) are selected from optical and/or thermal image detection devices and/or devices that detect both optical and also thermal images.

2. The apparatus (10) as in claim 1, wherein said rotating table (21), at least when it is in an operating condition inside the melting furnace (100a), is positioned on a substantially horizontal plane (PO).

3. The apparatus (10) as in claim 1, wherein said one or more image detection devices (17, 18, 24) are positioned on said rotating table (21) so as to have their optics (17a, 18a, 24a) in correspondence with a lateral wall (11a) of the inspection head (11).

4. The apparatus (10) as in claim 1, wherein said one or more image detection devices (17, 18, 24) have a viewing aperture (δ) on a vertical plane (PV) comprised between 30° and 95°, preferably 60°.

5. The apparatus (10) as in claim 2, wherein said one or more image detection devices (17, 18, 24) have a viewing aperture (γ) on said horizontal plane (PO) comprised between 30° and 95°, preferably 60°.

6. The apparatus (10) as in claim 1, wherein it comprises an optical image detection device (17) and a thermal image detection device (18) and does not comprise other image detection devices (17, 18, 24).

7. The apparatus (10) as in claim 1, wherein it comprises an optical and thermal image detection device (24) and does not comprise other image detection devices (17, 18, 24).

8. The apparatus (10) as in claim 1, wherein said inspection head (11) also comprises a body (16), integrally attached to said positioning support (12) and constrained in a mobile manner to said rotating table (21).

9. The apparatus (10) as in claim 1, wherein said rotating table (21) is able to rotate with respect to its axis (X) by an angle at least equal to, or greater than 360°.

10. The apparatus (10) as in claim 9, wherein said axis (X) is a substantially vertical axis, with an inclination of said axis (X) with respect to the vertical smaller than or equal to 0.5°.

11. The apparatus (10) as in claim 9, wherein the inclination of said axis (X) varies from −35° to +35°.

12. The apparatus (10) as in claim 1, wherein said rotating table (21) comprises a sensor (44) for measuring the angular position, able to associate the angular position of said rotating table (21) with one or more acquired images.

13. The apparatus (10) as in claim 1, wherein said positioning support (12) is a robotic articulated arm.

14. The apparatus (10) as in claim 13, wherein said positioning support (12) has one or more articulation points (12a), preferably two articulation points (12a).

15. The apparatus (10) as in claim 1, wherein said inspection head (11), and possibly at least part of the positioning support (12), are insulated, by means of layers (25a, 25b) of metallic material and insulating material.

16. The apparatus (10) as in claim 1, wherein said inspection head (11) comprises an external upper cover (25) which has apertures (27, 28) equipped with surfaces transparent to the wavelengths of the electromagnetic radiations that can be acquired by means of said image detection devices (17, 18, 24).

17. The apparatus (10) as in claim 1, wherein it comprises a compressed air cooling system wherein said inspection head (11) comprises one or more slots (22), for the passage of air.

18. The apparatus (10) as in claim 1, wherein it comprises at least one temperature sensor (19) and a data processing system (37) able to acquire data from said at least one temperature sensor (19), in order to activate procedures for the protection of the inspection head (11).

19. The apparatus (10) as in claim 1, wherein said inspection head (11) comprises a gear (43) and said positioning support (12) comprises a shaft (42), said gear (43) and shaft (42) cooperating to rotate said inspection head (11) around an axis (Y) perpendicular to said axis (X).

20. The apparatus (10) as in claim 1, wherein said inspection head (11) comprises a gear (43) and said positioning support (12) comprises a shaft (42), said gear (43) and shaft (42) cooperating to rotate, around an axis (Y) perpendicular to said axis (X), said rotating table (21) independently of the inspection head (11).

21. An inspection method for melting furnaces (100a) that can be used in the steel industry, by means of an inspection apparatus (10) as in claim 1, comprising the steps of:
   tapping molten metal;
   inserting an inspection head (11) into a melting furnace (100a) through an aperture (101) of the melting furnace (100a), by means of a positioning support (12);
   acquiring optical and/or thermal images of a strip of the environment (100) of the melting furnace (100a) which can be framed by one or more optical and/or thermal image detection devices (17, 18, 24), by means of the rotation of a rotating table (21) comprising said one or more devices (17, 18, 24), around an axis (X) of said rotating table (21);
   processing the images acquired, by means of a processing unit (13), in which the inspection head (11) is extracted from the furnace (100a) within a minute of it being inserted in a hot environment such as the inside of the melting furnace (100a).

22. The inspection method as in claim 21, wherein it provides that said rotating table (21) is positioned on a substantially horizontal plane (PO) at least when it is in an operating condition inside the melting furnace (100a).

23. The inspection method as in claim 21, wherein it provides that, during said image acquisition, the inspection head (11) is kept stationary in height by the positioning support (12).

24. The inspection method as in claim 21, wherein it also provides to rotate the inspection head (11) around an axis (Y) orthogonal to said axis (X) in order to acquire images of a different strip of the environment (100).

25. The inspection method as in claim 21, wherein it also provides to rotate said rotating table (21) around an axis (Y) orthogonal to said axis (X), independently of the inspection head (11).

\* \* \* \* \*